United States Patent [19]

Kondo

[11] 4,072,366
[45] Feb. 7, 1978

[54] ANTI-SKID CONTROL APPARATUS

[75] Inventor: Toshiyuki Kondo, Anjo, Japan

[73] Assignee: Aisin Seiki Kabushiki Kaisha, Kariya, Japan

[21] Appl. No.: 753,442

[22] Filed: Dec. 22, 1976

[30] Foreign Application Priority Data

Dec. 31, 1975 Japan .............................. 51-158547
Dec. 31, 1975 Japan .............................. 51-158549

[51] Int. Cl.² .............................................. B60T 8/10
[52] U.S. Cl. ....................................... 303/116; 303/92
[58] Field of Search ............. 188/181 A; 303/92, 112, 303/115–117, 119

[56] References Cited

U.S. PATENT DOCUMENTS

| 3,514,161 | 5/1970 | Frayer | 303/117 |
| 3,666,328 | 5/1972 | Williams | 303/115 |
| 3,671,085 | 6/1972 | Pasek et al. | 303/115 |
| 3,871,717 | 3/1975 | Jensen | 303/115 X |
| 3,922,021 | 11/1975 | Every | 303/116 |
| 3,926,480 | 12/1975 | Shibatani et al. | 303/117 |

Primary Examiner—Duane A. Reger
Attorney, Agent, or Firm—Finnegan, Henderson, Farabow & Garrett

[57] ABSTRACT

A hydraulic braking system for vehicles having front and rear wheel brakes energized from a master cylinder and wherein energization of the rear wheel brakes is interrupted by a cut-off valve which closes in response to a signal indicating a skid condition. The cut-off valve is normally held open by pressure from a fluid pressure source controlled by an actuator and is opposed by master cylinder pressure. The skid condition signal causes the sourced pressure to the cut-off valve to lower and the valve to close. The controlled pressure from the fluid pressure source to the cut-off valve is at least a predetermined minimum value to prevent unintended or premature valve closure, and an optimum ratio of that pressure to master cylinder pressure for increasing values of master cylinder pressure is maintained for stability of the system. Furthermore, this system can include a fail-safe valve operable to provide for brake energization in the event of failure of pressure from the pressure source.

15 Claims, 13 Drawing Figures

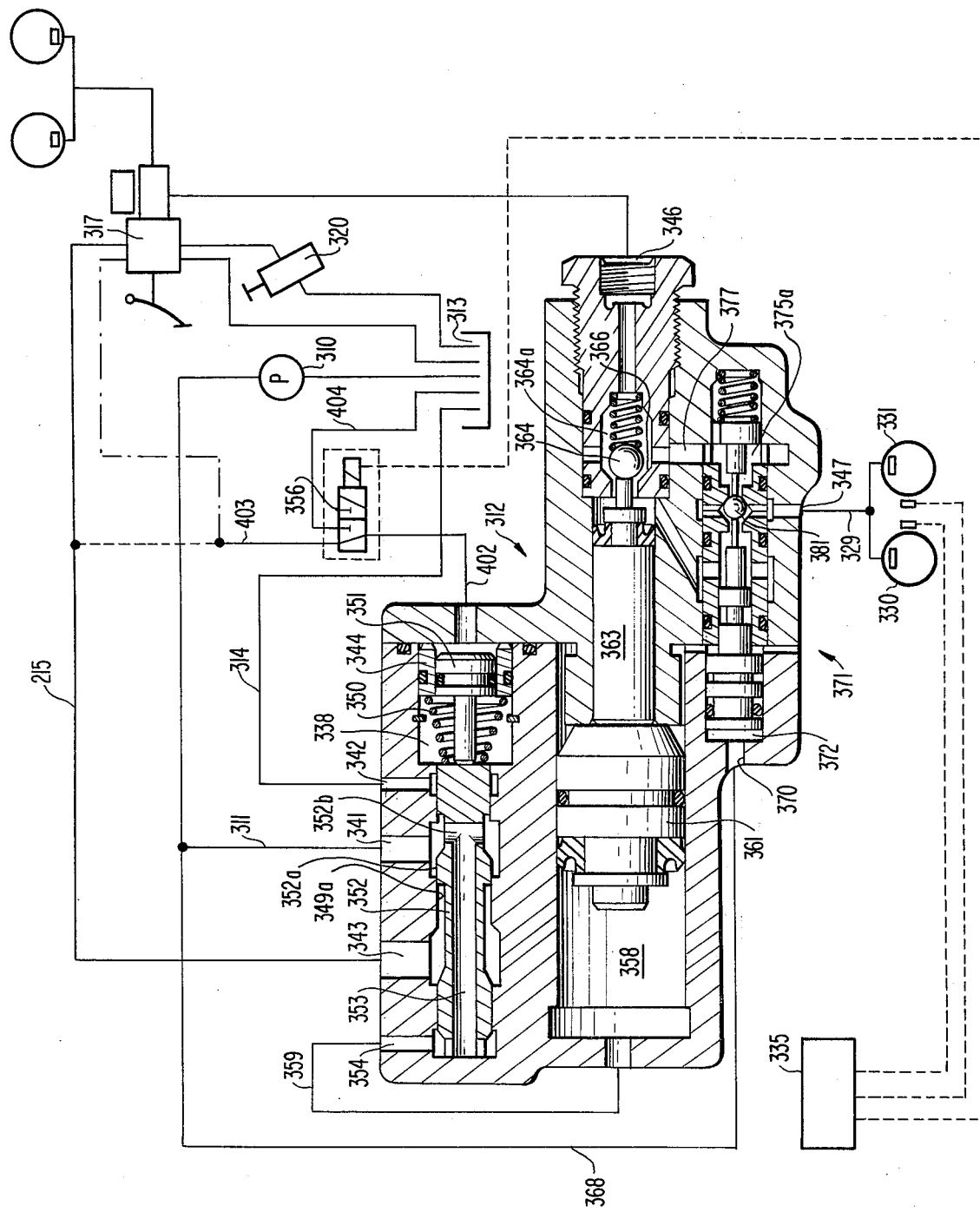

ANTI-SKID CONTROL APPARATUS

BACKGROUND OF THE INVENTION

In many anti-skid control systems for vehicles, the power pressure used to operate an anti-skid control actuator varies in response to either the brake pressure developed by the master cylinder or the pressure at a master cylinder booster. When master cylinder or booster pressure is low, such as at initial brake application, the actuator operating pressure is also low, so that operation of the anti-skid control actuator in this low pressure range is unstable.

Furthermore, in such systems employing a fail-safe valve operable to develop brake pressure at the wheel brakes when power pressure fails, such as when the power pump fails or a power pressure line ruptures, operation of the fail-safe valve often is unstable and impedes proper operation of the anti-skid control system.

SUMMARY OF THE INVENTION

Accordingly, it is a primary object of the present invention to provide an improved vehicle anti-skid control device.

It is a further object of this invention to provide an improved anti-skid control device wherein the power pressure acting on the master cylinder may be varied in a proper proportion to the brake pressure developed by the master cylinder, and the power pressure may be rapidly increased relative to the brake pressure at low brake pressures, such as during the initial stage of the brake application, thereby enhancing stability and reliability in the operation thereof.

It is still another object of this invention to provide an improved anti-skid control device which eliminates the possibility of accidental actuation thereof.

It is still a further object of this invention to provide an improved anti-skid control device which may include failsafe means facilitating brake actuation in the event of failure of the fluid pressure source.

Still another object of this invention is to provide an improved anti-skid control device which minimizes engine load.

Additional objects and advantages of the present invention will be set forth in the description which follows and in part will be obvious from the description, or may be learned by practice of the invention. The objects and advantages of this invention may be realized and attained by means of the instrumentalities and combinations particularly pointed out in the appended claims.

To achieve the foregoing objects and in accordance with the purpose of the invention, as embodied and broadly described herein, the anti-skid control device of this invention is directed to a hydraulic braking system for an engine driven vehicle having front and rear wheel brakes, brake energization means including a master cylinder interconnected with said front and rear wheel brakes and operable to effect pressurization thereof, and a cut-off valve between said master cylinder and said rear wheel brakes and operable to interrupt pressurization of said rear wheel brakes in response to a signal indicating a skid condition; the improvement which comprises pressure responsive means operably engaging said cut-off valve and acted upon by fluid pressure from said master cylinder, an engine driven fluid pressure source acting on said pressure responsive means in opposition to said master cylinder pressure and normally operable to hold said cut-off valve open, pressure control means between said fluid pressure source and said pressure responsive means and including means developing a predetermined minimum pressure in said fluid pressure source, means interconnecting said pressure control means and said brake energization means to vary in the pressure from said fluid pressure source to said pressure responsive means in response to braking pressure applied to said rear wheels, a control valve operable in response to a signal indicating a skid condition at said rear wheels to lower the pressure from said fluid pressure source to said pressure responsive means to close said cut-off valve and interrupt pressurization of said rear wheel brakes.

The accompanying drawings, which are incorporated in and constitute a part of this specification, illustrate several embodiments of the invention, and together with the description, serve to explain the principles of the invention.

BRIEF DESCRIPTION OF THE DRAWINGS

Of the Drawings:

FIG. 5 is a view, similar to FIGS. 1 and 4, and showing a further modified form of the invention;

DETAILED DESCRIPTION OF THE INVENTION

Reference will now be made in detail to the preferred embodiments of the invention, examples of which are illustrated in the accompanying drawings.

Figure 1:
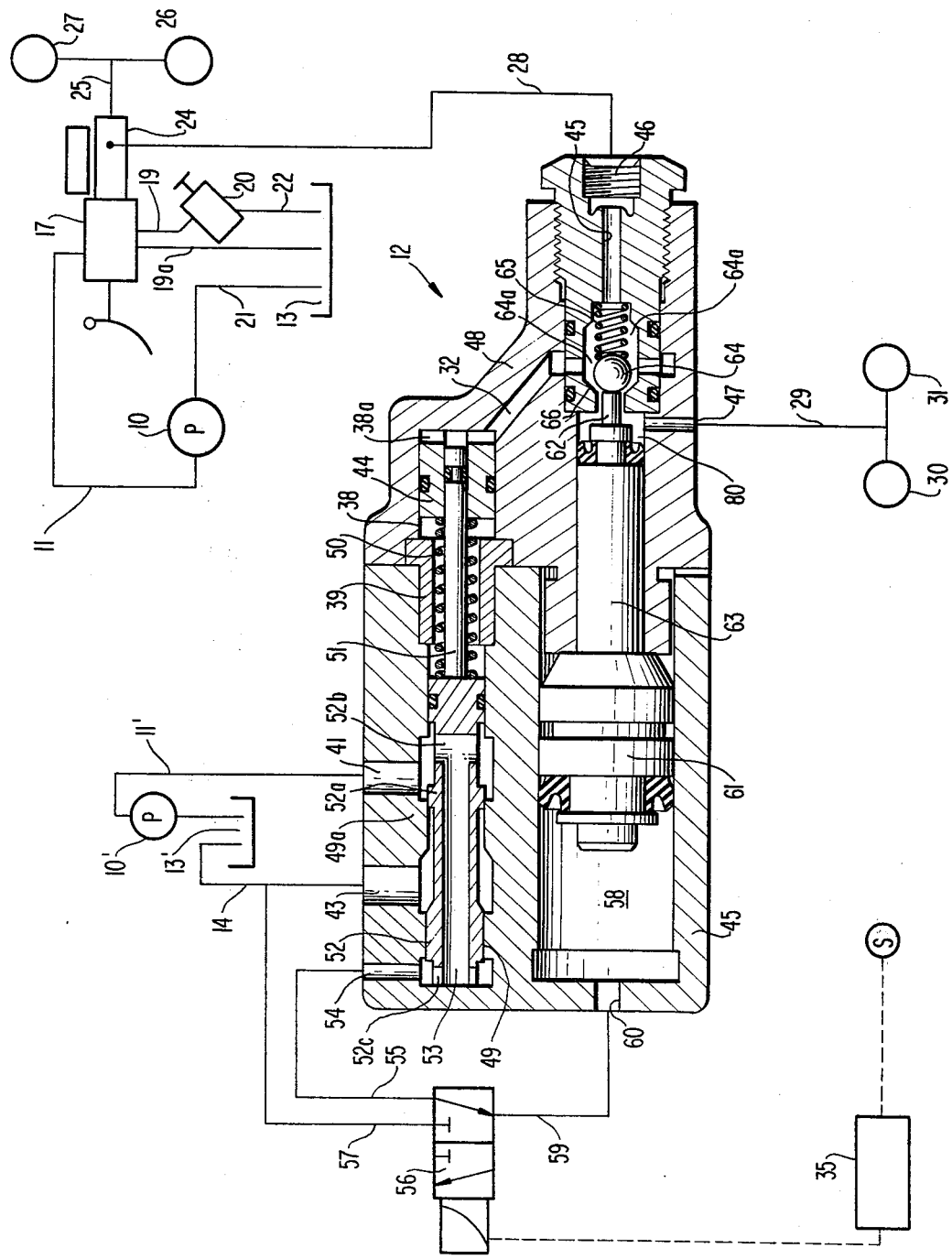
FIG. 1 is a sectional view of one embodiment of an anti-skid control device constructed in accordance with this invention.

Referring now to FIG. 1, an anti-skid control device constructed according to the present invention is shown embodied in a vehicular braking system which includes a pedal actuated booster 17 in fluid communication with an engine driven pump 10 and a power steering 20 through conduits 11, 19. The power steering 20 and booster 17 are connected to a reservoir 13 by a conduit 22, and pump 10 is connected to reservoir 13 by a conduit 21.

The booster 17 develops an increased fluid pressure in a master cylinder 24 and together therewith forms brake energization means. Master cylinder 24 is connected by conduit 25 to front wheel brakes 26, 27 and by conduits 28, 29, and pressure control means including an actuator 12, to rear wheel brakes 30, 31 as will be described.

As here embodied, the actuator 12 includes a housing comprising component parts 45, 48 suitably secured together as by bolts (not shown). Housing part 45 is provided with an inlet port 41 and discharge ports 43 and 54 communicating with a bore 49. Housing part 48 is provided with an inlet port 46 and a discharge port 47. Port 41 is connected by a conduit 11' to a fluid pressure source including an engine driven pump 10' while port 43 is connected to a reservoir 13' via conduit 14. Pumps 10 and 10' may be separate engine driven pumps, as shown in FIG. 1, or a single such pump may be used as illustrated and described in embodiments to follow. Port 54 is connected to a power chamber 58 via conduit 55, a magnetically operated switch-over valve 56, a conduit 59 and a port 60.

Pressure responsive menas is provided which includes a power piston 61 slidably disposed in power chamber 58 and abutting against or formed integral with a pressure decreasing piston 63 slidably disposed in a pressure decreasing chamber 80. A projecting tip 62 of piston 63 abuts a cut-off valve ball 64. A compression spring 65 positioned in valve chamber 64a biases valve ball 64 toward a valve seat 66.

Cut-off valve chamber 64a is connected by a passage 45 to inlet port 46, and by a passage 32 to a chamber 38a formed by a bore 38. The pressure decreasing chamber 80 is in fluid communication with the rear wheel brakes 30 and 31 through the port 47 and conduit 29.

In accordance with the invention, pressure control means controlling the pressure to the power chamber 58 is provided and includes a control piston 52 slidably disposed in the bore 49 formed in housing part 45. Piston 52 itself is longitudinally bored forming a chamber 53 terminating near one end of piston 52 in a transverse passage 52b communicated with inlet port 41.

The control piston 52 is formed with an outer land 52a which cooperates with a land 49a formed in bore 49 of housing part 45 serving to restrict the flow of fluid from inlet port 41 to discharge port 43. However, when piston 52 moves toward the right, as seen in FIG. 1, land 52a separates from land 49a and fluid can flow from the inlet port 41 to the discharge port 43. The end of piston 52 remote from passage 52c is provided with slots 52c which communicate chamber 53 with the discharge port 54.

In accordance with the invention, the pressure control means further includes a helical spring 50 interposed between the right end of control piston 52 and a tubular piston 44 slidably fitted in bore 38. The right end of the tubular piston 44 rests on the inner end wall of the chamber 38a when no fluid pressure is supplied thereto. The pressure control means also includes a rod piston 51 sealingly and slidably fitted in the tubular piston 44 and having its left end normally engaging the control piston 52, while the right end thereof is exposed to fluid pressure in the chamber 38a. A stopper 39 is fixed to the housing parts 45 and 48 around the spring 51 and limits movement of the tubular piston 44 in a left hand direction as viewed in FIG. 1.

In operation, when the pump 10' is actuated, fluid pressure in the chamber 53 increases because of the restriction to fluid flow caused by engaged lands 49a, 52a. As pressure increases in chamber 53, it causes the control piston 52 to move toward the right thereby releasing the land 52a from the land 49a. Thus, the port 42 is fluidically connected to the port 41 so that the outlet fluid of pump 10' is drained to the reservoir 13' via conduit 14. This constitutes the fluid circuit for the pump 10' while the brake pedal is unactuated.

Valve 56 is normally in the position shown in FIG. 1 and communicates chamber 53 and power chamber 58 through slots 52c, port 54 and conduits 55, 59. This causes the power piston 61 to move in a right-hand direction to the position shown in FIG. 1 and holds the cut-off valve ball 64 in the "open" position shown.

When the brake pedal is depressed, fluid pressure in the master cylinder 24 is supplied to the front wheel brakes 26, 27 by conduit 25, and to rear wheel brakes 30, 31 by conduit 29, port 46, passage 45, chambers 64a and 80, port 47 and conduit 29. Fluid pressure is also supplied to the chamber 38a via passage 32 and chamber 64a. As a result, the pistons 44 and 51 are moved toward the left thereby moving the control piston 52 to the left and balancing the fluid pressure in the chamber 53 and 39a. Fluid pressure in the chamber 53 is controlled by the pressure receiving area difference between the piston 52 and the pistons 44, 51 and by the exerting force of the compression spring 50.

When the rear wheels begin to skid and are locked during braking, a sensing means S generates a signal to actuate a computer 35 and shifts the solenoid valve 56. Thus, connection between the conduit 59 and conduit 55 is interrupted and conduit 59 is now connected to the conduit 14 and reservoir 13' through conduit 57, thereby lowering the pressure in the power chamber 58. As a consequence, the power piston 61 and the pressure decreasing piston 63 move toward the left to thereby allow the cut-off valve ball 64 to engage the seat 66 under the force of spring 65. This interrupts fluid communication between the master cylinder 24 and the rear wheel brakes 30, 31.

In addition, the piston 61 and 63 are moved further toward the left due to residual pressure in the chamber 80 to thereby increase the capacity of the chamber 80. Thus, the fluid pressure in chamber 80 is reduced and serves to release application of the rear brakes 30, 31.

When rear wheel skidding stops, another signal from sensing means S energizes the solenoid valve 56 to return it to the position illustrated in FIG. 1 by means of computer 35. This causes valve ball 64 to unseat again whereupon pressurization of the rear wheel brakes is re-established and the sequence can be repeated.

Further depression of the brake pedal increases the fluid pressure in the master cylinder 17. Such increased pressure is admitted to the chamber 38a thereby increasing the leftward urging force on the pistons 44 and 51. Accordingly, the piston 52 is urged toward the left and restricts fluid communication past the lands 52a and 49a. The relative position between the lands 52a and 49a is adjusted during braking by balancing the power pressure $P_p$ supplied from pump 10' and acting in the chamber 53, and the brake pressure $P_b$ from master cylinder 24 and acting in the chamber 38a.

It is noted that the lands 49a and 52a are shown engaged in FIG. 1 which is the position of the parts when the pump 10' is unactuated. However, the other elements such as cut-off valve ball 64 are shown in the position when pump 10' is actuated. This is for convenience of the explanation.

Figure 2:
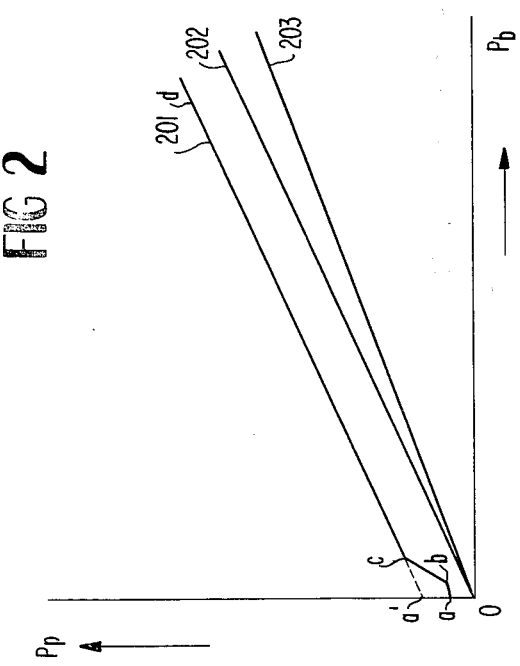
FIGS. 2 and 3 are graphic representations of the power pressure and brake pressure characteristics according to the apparatus of FIG. 1.

It will be understood that when the pump 10' is actuated, fluid in the chamber 53 is pressurized without depression of the pedal and moves piston 52 toward the right as described, and separates the lands 49a and 52a in opposition to the exerting force of the spring 50. In FIG. 2 wherein the line 201 indicates the relationship between the power pressure $P_p$ in the chamber 53 and the brake pressure $P_b$ in the chamber 38a, the setting force of spring 50 increases the power pressure $P_p$ by a value of "a" even before the brake pedal is applied. Thus, spring 50 develops a predetermined minimum power pressure $P_p$ and prevents premature or unintended seating of cut-off valve ball 64.

The tubular piston 44 is held against the inner end wall of chamber 38a as long as $P_b \times A1 < F1$ (where $P_b$ = brake pressure developed by master cylinder 24 in chamber 38a; A1 = pressure receiving area of piston 44; F1 = setting force of spring 50). This period of time corresponds to portion a-b of the line 201 of FIG. 2. During this time, $P_b$ and $P_p$ are varied in accordance with the ratio of A2/A3 (where A2 = pressure receiving area of the rod piston 51; and A3 = pressure receiving area of the control piston 52).

When $P_b = A1 \geq F1$, piston 44 initiates compression of the spring 50 and the right end of the tubular piston 44 moves away from the inner wall of the chamber 38a. Thereafter, $P_p \times A3 = P_b(A1 + A2)$ and the slope of the portion b-c of the line 201 is represented by $$\frac{A1 + A2}{A3}.$$

At point "c" of line 201 shown in FIG. 2, the tubular piston 44 has moved into engagement with stopper 39 under the force of increasing brake pressure $P_b$. Further increase in $P_p$ results in an increase of the brake pressure $P_b$ in accordance with portion c-d of line 201 shown in FIG. 2. The slope of portion c-d of the line 201 is $$\frac{A2}{A3}.$$

In order to achieve quick operation of actuator 12 in response to a skidding condition at the rear wheels, it is necessary to achieve a proper and controlled balance of the forces developed by the power pressure $P_p$ in the power chamber 58 acting on power piston 61, and that of the brake pressure Pb in the pressure decreasing chamber 80 acting on pressure reducing piston 63, for all values of power pressure. This is necessary to insure that valve ball 64 closes immediately following shifting of valve 56.

In accordance with the invention, the pressure control means including the control piston 52, the tubular piston 44, and the rod piston 51 retain this controlled balance in response to the brake pressure increase, as is apparent from the line 201 of FIG. 2.

In addition, it is necessary to avoid unintended or premature closing of the cut-off valve ball 64. Thus, the cut-off valve ball 64 should not be permitted to seat on the valve seat 66 when a skidding condition at the rear wheels does not exist. In order to avoid such unintended cut-off valve operation, the value of power pressure $P_p$ at which brake pressure $P_b$ begins, could be set sufficiently high, such as at point "a'" of FIG. 2. However, if the value of "a'" is too high, the output of the engine driven pump 10' and the resulting drain on the engine is increased. Accordingly, it is desirable to minimize the difference between $P_p$ and $P_b$ during no brake application and to rapidly increase the power pressure relative to the brake pressure just after brake application. This is achieved by the setting force of spring 50 which causes the power pressure from pump 10' acting on power piston 61 to attain the value of "a" as described. Furthermore, according to this invention, the power pressure $P_p$ rapidly increases with increasing brake pressure $P_b$ as the tubular piston 44 and the rod-piston 51 move toward the left and confront and cooperate with the control piston 52.

It is noted in FIG. 2 that the line 202 indicates the relationship between $P_p$ and $P_b$ according to another embodiment hereinafter explained, and the line 203 indicates the relationship between $P_b$ and $P_p$ applied on the power piston 61 and the pressure decreasing piston 63 to actuate the cut-off valve 64.

Figure 3:
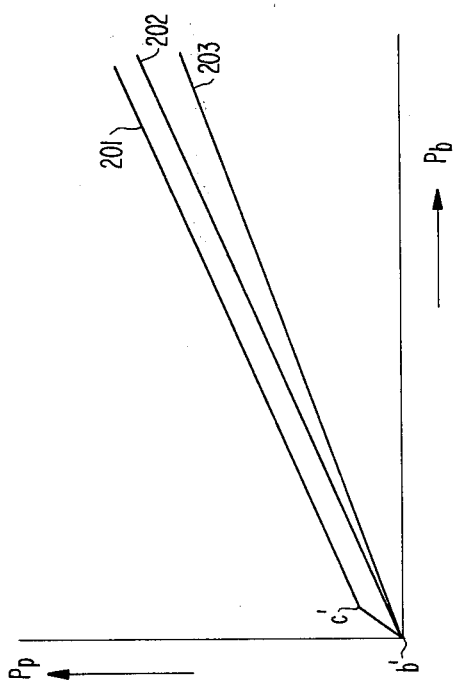

If the initial setting force (force of spring 50) were equal to zero, the pressure characteristic lines of FIG. 2 would be as in FIG. 3. The pressure characteristics illustrated by the lines of FIG. 3 have the advantages that the load on the pump 10' (and the drain on the engine) is smaller.

Figure 4:
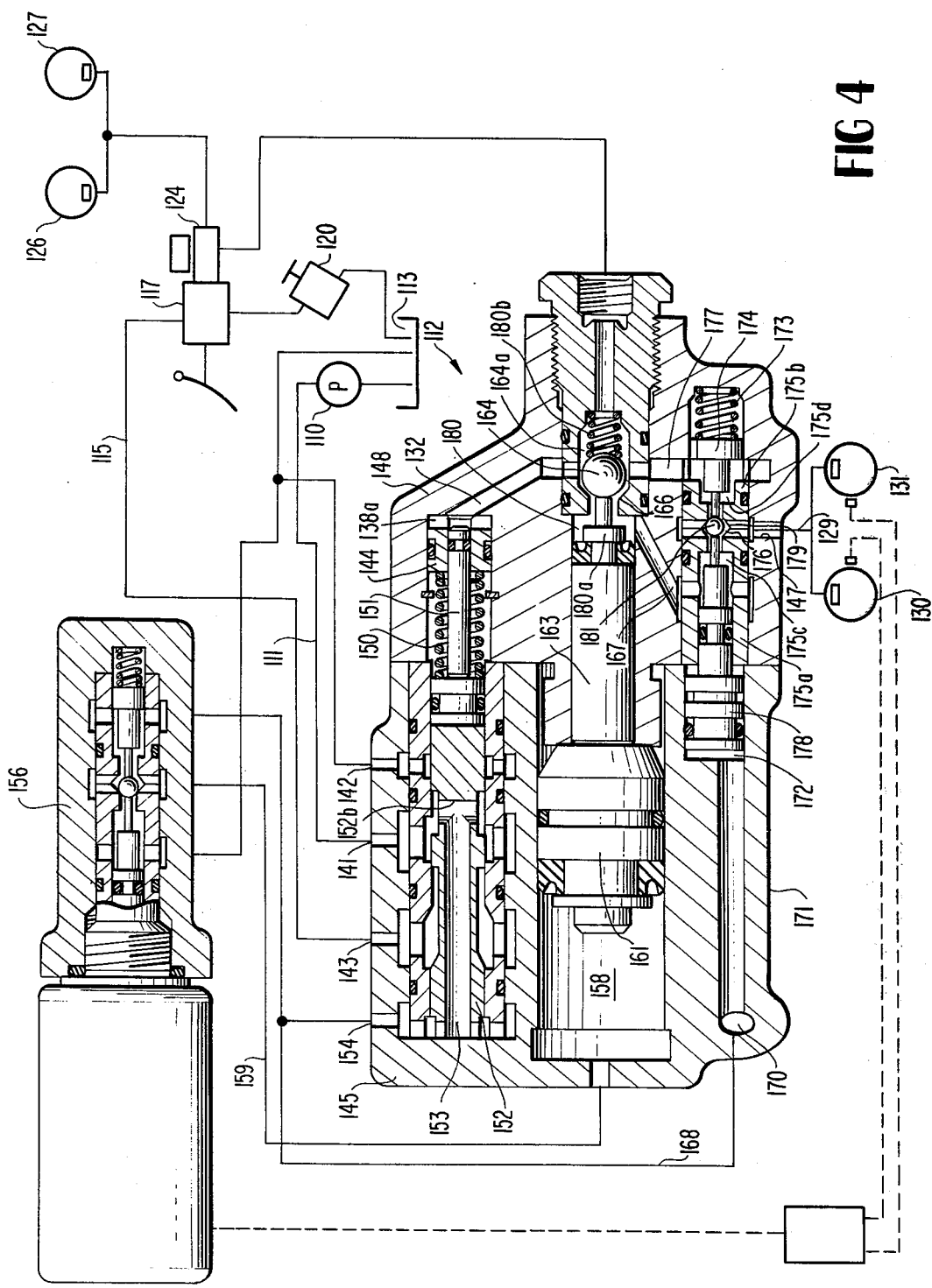
FIG. 4 is a view, similar to FIG. 1, showing a modified form of the invention.

A second embodiment of the present invention is shown in FIG. 4. In this embodiment, a safey valve 171 is provided to enable brake operation in the event of pressure failure in the pump system. Also, a single engine driven pump 110 supplies pressure to both a booster 117 and an actuator 112.

In this embodiment, pump 110 supplies pressurized fluid through conduit 111 to actuator inlet port 141. When the pump 110 is energized, control piston 152 moves toward the right, as seen in FIG. 4, to separate seats 152a and 149a, and thereby establishes communication between port 141 and a discharge port 143. Thus, fluid then flows through conduit 115 to the booster 117, through power steering 120, and back to reservoir 113.

At the same time, pressurized fluid from pump 110 in piston chamber 153 emerges from a discharge port 154 in actuator 112 and flows through solenoid valve 156 (normally positioned as shown), through conduit 159, and to power chamber 158 to maintain cut-off ball 164 spaced from seat 166. The pressure in power chamber 158 is controlled by the position of control piston 152 as was the case in the embodiment of FIG. 1.

As here embodied, the safety valve means 171 is included as part of the housing which also includes the actuator 112. This housing includes a first part 145 formed with an inlet port 170 to which is connected a conduit 168. Fluid pressure is supplied to conduit 168 and port 170 from pump 110, through conduit 111, control piston chamber 153, and discharge port 154.

Another port 142 communicates with reservoir 113 in the event pressure at port 154 becomes excessive. In that case, the piston 152 would move in a right-hand direction and communicate passage 152b with port 142.

In accordance with this embodiment of the invention, a piston 178 is slidably mounted in a sleeve 175a and in a chamber 172, and has a projection at its right end positioned to abut a valve ball 181. The valve ball 181 is interposed between valve seats 176, 179 formed on sleeves 175a, 175b and can engage either one of these valve seats. The sleeves 175a, 175b are secured to a second housing part 148.

An inner hollow of the sleeve 175a forms a chamber 175c in communication with the pressure decreasing chamber 180 via passage 167. The ball is urged to move left by a piston 174 biased by a compression spring 173. The interior of the sleeve 175b forms a chamber 175d which is in communication with a cut-off chamber 164a via passage 177.

In the event of hydraulic failure of pump 110 or the fluid circuit connected thereto, pressure in the chamber 172 is decreased whereupon the valve ball 181 moves off the seat 179 and onto the seat 176 under the force of spring 173. Thereafter, brake pressure is supplied to rear wheel brakes 130, 131 directly from the cut-off chamber 164a, passage 177, chamber 175d, past ball 181, and through port 147, and the conduit 129. During such braking, cut-off valve ball 164 is kept seated on a seat 166 under the force of spring 180b since the pressure in power chamber 158 is decreased.

When the pressure of pump 110 may not be obtained, the master cylinder 124 can be actuated by the manual operation without assistance of brake booster 117.

In all other respects, including the operation of control piston 152 and that of pistons 144, 151 and spring 150, the embodiment of FIG. 4 is substantially the same as that of FIG. 1, so that further description of FIG. 4 is not necessary here. It is understood that in the embodiment of FIG. 4, numerals with the prefix "1" illustrate components similar to components in FIG. 1 indicated by the same numeral but without the prefix.

FIG. 5 illustrates a third embodiment of the invention. Again, similar numerals but with the prefix "3" illustrate similar components to those in FIGS. 1 and 4. Thus, in FIG. 5, an engine driven pump 310 supplies pressurized fluid through a conduit 311 to an inlet port 341 of an actuator 312, and through a conduit 368 directly to an inlet port 370 of a safety valve 371. Pressurized fluid in conduit 311 acts on control piston 352 to move it toward the right, as seen in FIG. 5, again to separate lands 349a, 352a, and thereby to establish communication between inlet port 341 and discharge port 343. In addition, pressurized fluid within piston chamber 353 exits through discharge port 354 and is communicated with power chamber 358 by a conduit 359. A discharge port 342 in actuator 312 communicates the chamber 353 with the reservoir 313 during wheel skidding as will be described.

Pressure control means, which includes the piston 352, also includes a piston 344 slidable in a bore 338 and engaging one end of a compression spring 350 which also engages the piston 352. Also included is a piston 351 slidable within piston 344 and directly abutting piston 352. However, unlike the embodiments of FIGS. 1 and 4, fluid pressure is admitted to bore 338 to bias pistons 344, 351 toward the left from booster 317 through solenoid valve 356.

In use, if a skidding condition develops at the rear wheels, a signal is developed which through a computer 335 shifts the solenoid valve 356. When this occurs, pressure from the booster 317 is disconnected from a conduit 402 so that control piston 352 moves toward the right and dumps pressure from chamber 353 to reservoir 313 through port 342 and conduit 314. This causes the pressure in the power chamber 358 to lower, whereupon, the cut-off valve ball 364 engages seat 366 and the rear wheel brakes 330, 331 release.

The safety valve mechanism 371 functions in substantially the same manner as the safety valve 171 of the embodiment of FIG. 4. Thus, if there is a pressure failure at the pump 310 or the fluid circuitry associated therewith, pressure in the chamber 372 drops and the valve ball 381 shifts toward the left to allow direct communication from the master cylinder 324 through the chamber 364a, passage 377, chamber 375a, port 347, and conduit 329 to rear wheel brakes 330, 331.

Figure 6:
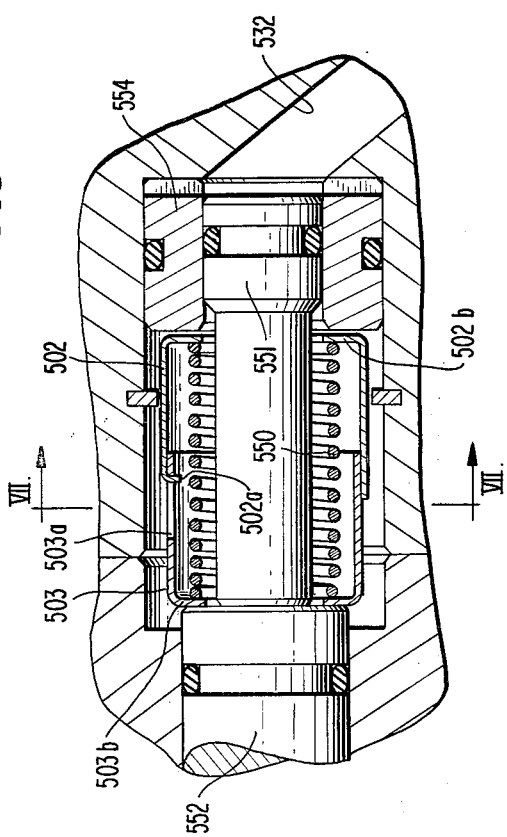
FIG. 6 is an enlarged longitudinal sectional view showing a coil spring construction particularly useful in the present invention.
Figure 7:
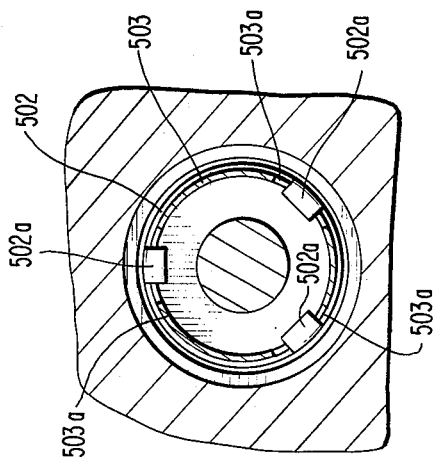
FIG. 7 is a sectional view of the construction of FIG. 6 taken along the line VII—VII thereof.

FIGS. 6 and 7 show means for fixing the maximum stretching length of a spring illustrated as 550 and which is useful in any of the embodiments of FIGS. 1, 4 and 5 for the springs 50, 150, 350. Retainers 502, 503 are provided with flanges 502b, 503b engaging opposite ends of the spring 550. The inner end of the retainer 502 is bent to form a pawl 502a which slidably engages a groove 503a in the retainer 503. Thus, the scatter or installation load of springs may be adjusted.

Figure 8:
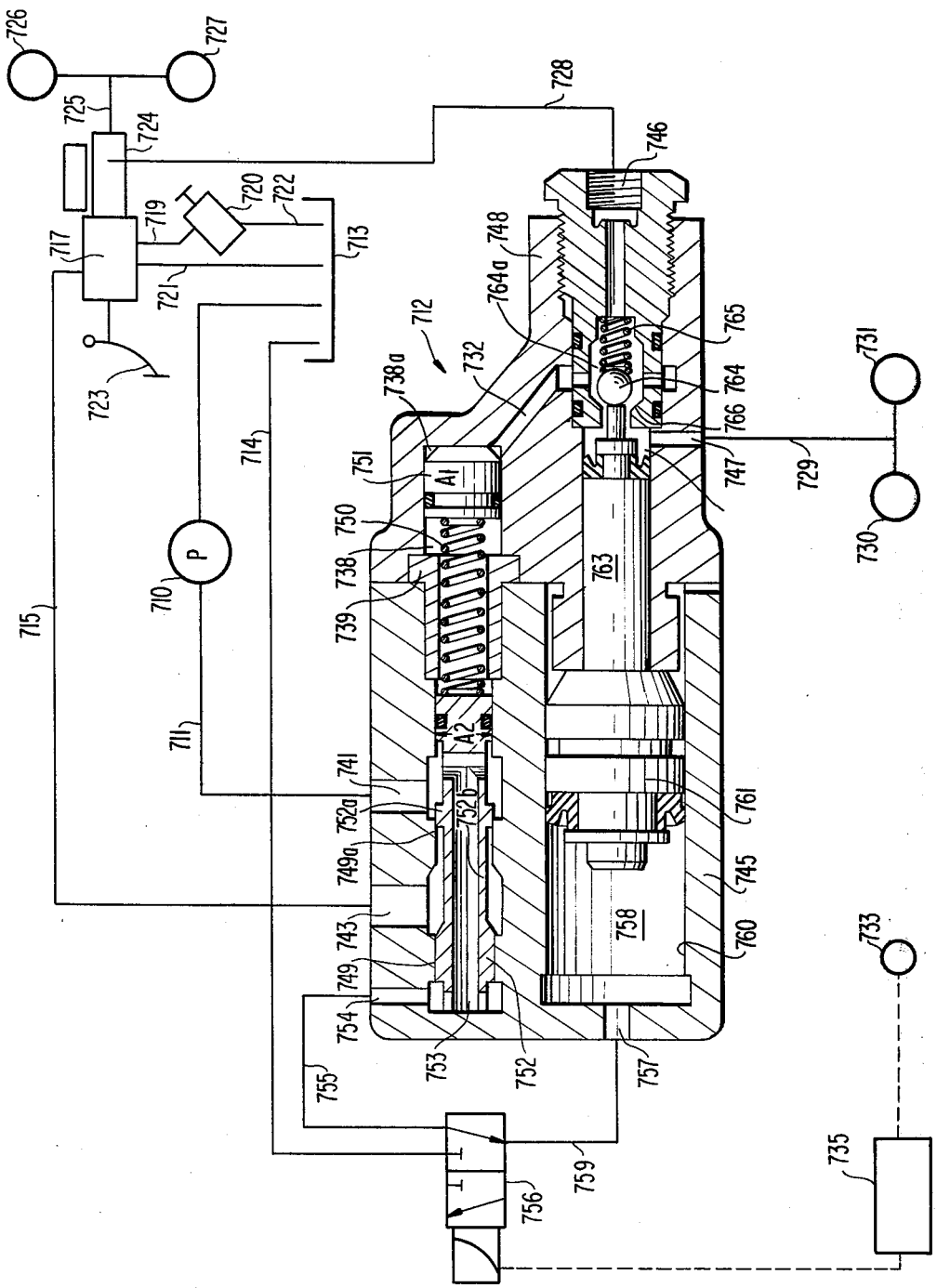
FIG. 8 is a view similar to FIGS. 1, 4 and 5 and showing a still further modified form of the invention.

The embodiment of FIG. 8 (wherein the illustrated components use the prefix "7") is similar to the embodiment of FIG. 1 except that a single engine powered pump 710 supplies pressure to the actuator 712, and to the booster 717 and the power steering 720. In addition, the pressure control means includes a control piston 752 biased in a left-hand direction by a compression spring 750 acted upon by a single piston 751 slidably disposed in a bore 738. A passage 732 communicates master cylinder pressure from chamber 764a with a chamber 738a formed by bore 738.

It will be appreciated that the power pressure $P_p$ in control piston chamber 753 is controlled by the restriction between lands 749a and 752a and the setting force of spring 750. This pressure is represented at point "a" in FIG. 9.

In this embodiment of the invention, depression of the brake pedal 723 develops brake pressure in the master cylinder 724 through booster 717. The fluidic pressure supplied to conduit 725 is applied to the front wheel brakes 726, 727, while pressure supplied to the chamber 764a is admitted to the rear wheel brakes 730, 731.

When the rear wheels lock during braking, as in a skid, a signal from sensor 733 acting through computer 735 switches the solenoid valve 756 to connect the power chamber 758 with the reservoir 713 through conduit 714. As a result, the cut-off valve ball 764 engages the seat 766 under the force of spring 765 and the rear wheel brakes are released.

As described, the brake pressure $P_b$ admitted to the chamber 764a is supplied also to the chamber 738a through the passage 732. At a predetermined level of pressure $P_b$, the piston 751 moves in a left-hand direction and, through the spring 750, increases the left-hand biasing force on the control piston 752.

Figure 9:
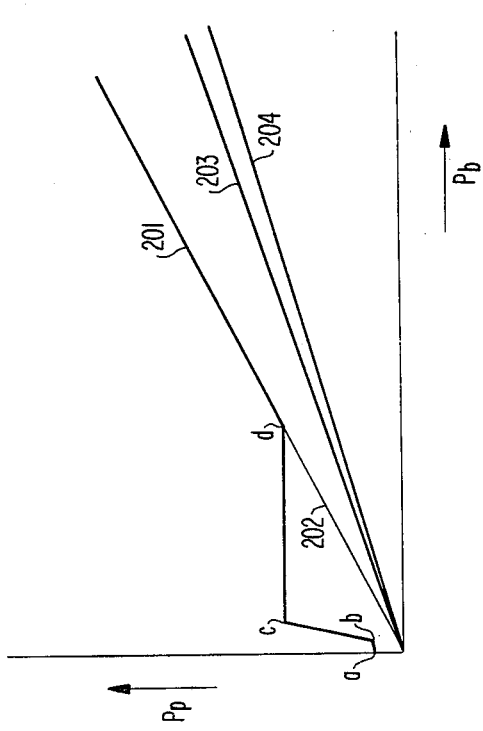
FIGS. 9 and 10 are graphic representations of the power pressure characteristics according to the apparatus of FIG. 8.

In FIG. 9, point "a" represents the setting force F1 of spring 750. For values of braking pressure Pb where $P_b \times A1 = F1$ (where A1 = area of piston 751) the relationship between $P_p$ and $P_b$ is represented by segment a-b of line 201.

At point "b", $P_b \times A1 = P_p \times A2$ (where A2 = pressure receiving area of piston 752) so that further increase in $P_b$ moves piston 751 in a left hand direction. For values of $P_p$ and $P_b$ beyond this point and until the piston 751 engages the stopper 739, the relationship between $P_p$ and $P_b$ is represented by segment b-c. The slope of segment b-c is relatively steep since A1>A2.

When the brake application is further increased after the piston 751 engages the stopper 739, the brake pressure $P_b$ in the chamber 738a is increased while the power pressure $P_p$ in the chamber 753 is kept constant. This is so because the piston 751 is now immovable and is indicated by segment c-d of line 201. During this stage, $P_p \times A2 = F1 + K1 \times XO$ (where K1 = the constant of spring 750; XO = the full stroke of the piston 751 until engaged with the stopper 39).

When the brake pressure $P_b$ in the chamber 738 is further increased over the power pressure $P_p$ in the chamber 753, the relationship between the power pressure $P_p$ and brake pressure $P_b$ is represented by the continuing segment from point $d$ on the line 201. During this time, lands 749a and 752a are fully opened to freely connect the conduit 715 with the chamber 753.

The power pressure $P_p$ is supplied from conduit 755 through valve 756 and conduit 759 to the power chamber 758 to hold cut-off valve ball 764 open. The pressure receiving areas of power piston 761 and pressure decreasing piston 763 are so selected that the power pressure $P_p$ may be varied relative to the brake pressure $P_b$ as shown by the line 204 in FIG. 9. The line 204 means that if the power pressure $P_p$ is slowly increased at the initial stage of braking, the cut-off valve 764 cannot be accidentally seated on the seat due to the brake pressure $P_b$. According to the invention, the power pressure $P_p$ is considerably higher than the brake pressure $P_b$ as seen by segments $a$-$b$ and $b$-$c$ of line 201.

Figure 10:
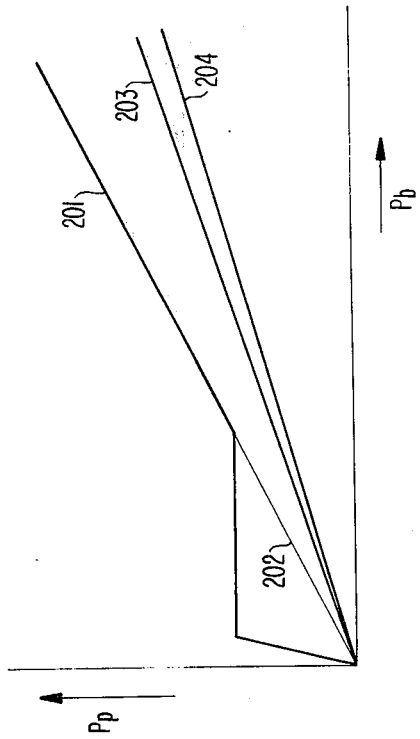

If the installation load (setting force) F1 of spring 750 is zero, the pressure lines of FIG. 9 would be as illustrated in FIG. 10 which is beneficial in engine output economy because the pressure in the chamber 753 is kept low during non-operation and requires less power drain by the pump 710 on the engine.

Figure 11:
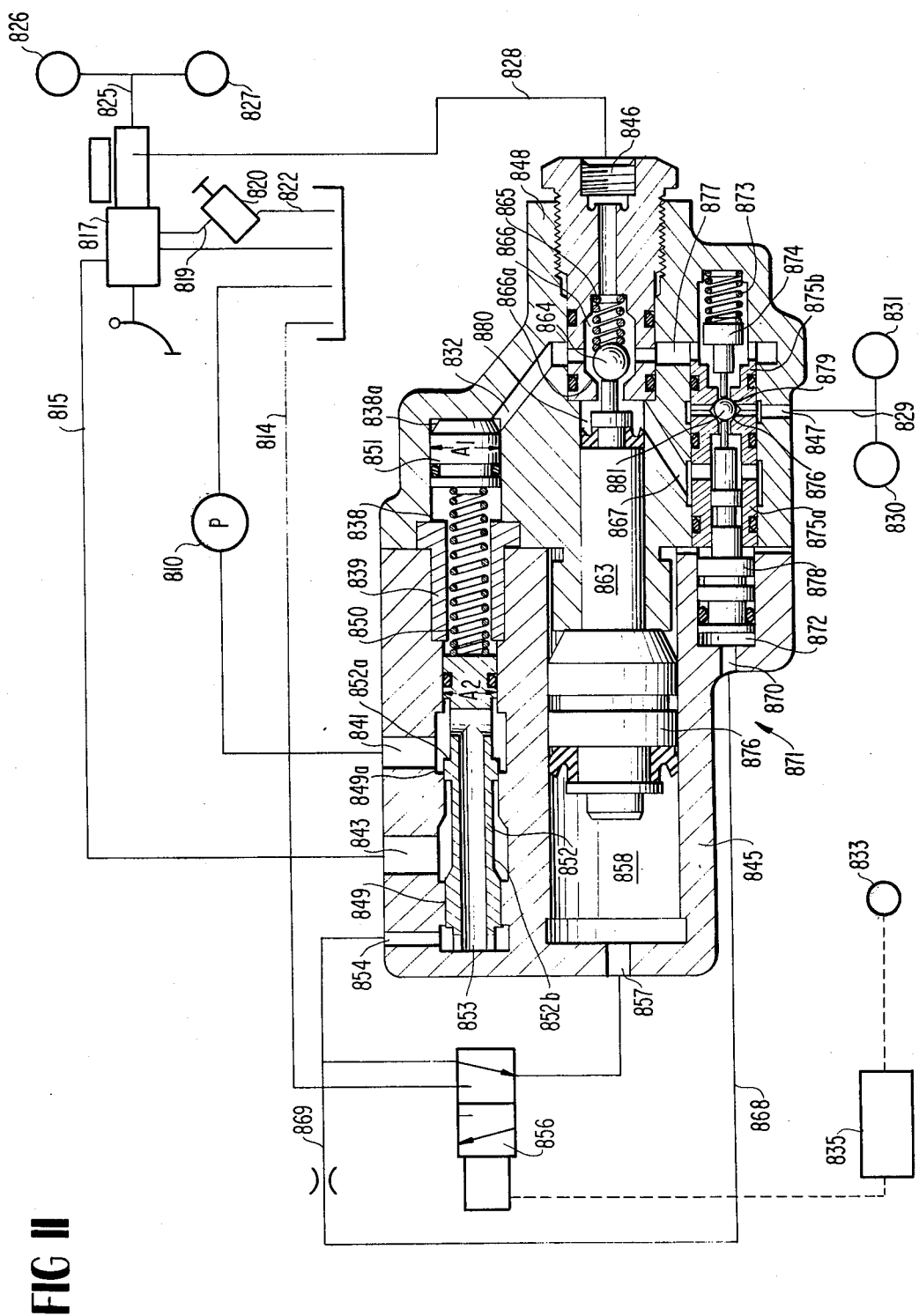
FIG. 11 is a view similar to FIGS. 1, 4, 5 and 8 and showing a still further modified form of the invention.

Still another embodiment of the present invention is illustrated in FIG. 11. This embodiment (wherein components are illustrated using the prefix "8") differs from the embodiment of FIG. 8 in the provision of a safety valve 871 which facilitates brake operation should there be a pressure failure in the hydraulic system including the pump 810 and the associated pressure lines. In that event, hydraulic pressure in the chamber 853 drops, and the ball 881 is moved left to seat on the seat 876. Thus, the brake pressure $P_b$ is applied directly to the rear brakes 830, 831 via passage 877, sleeve 875b, and the port 847.

Figure 12:
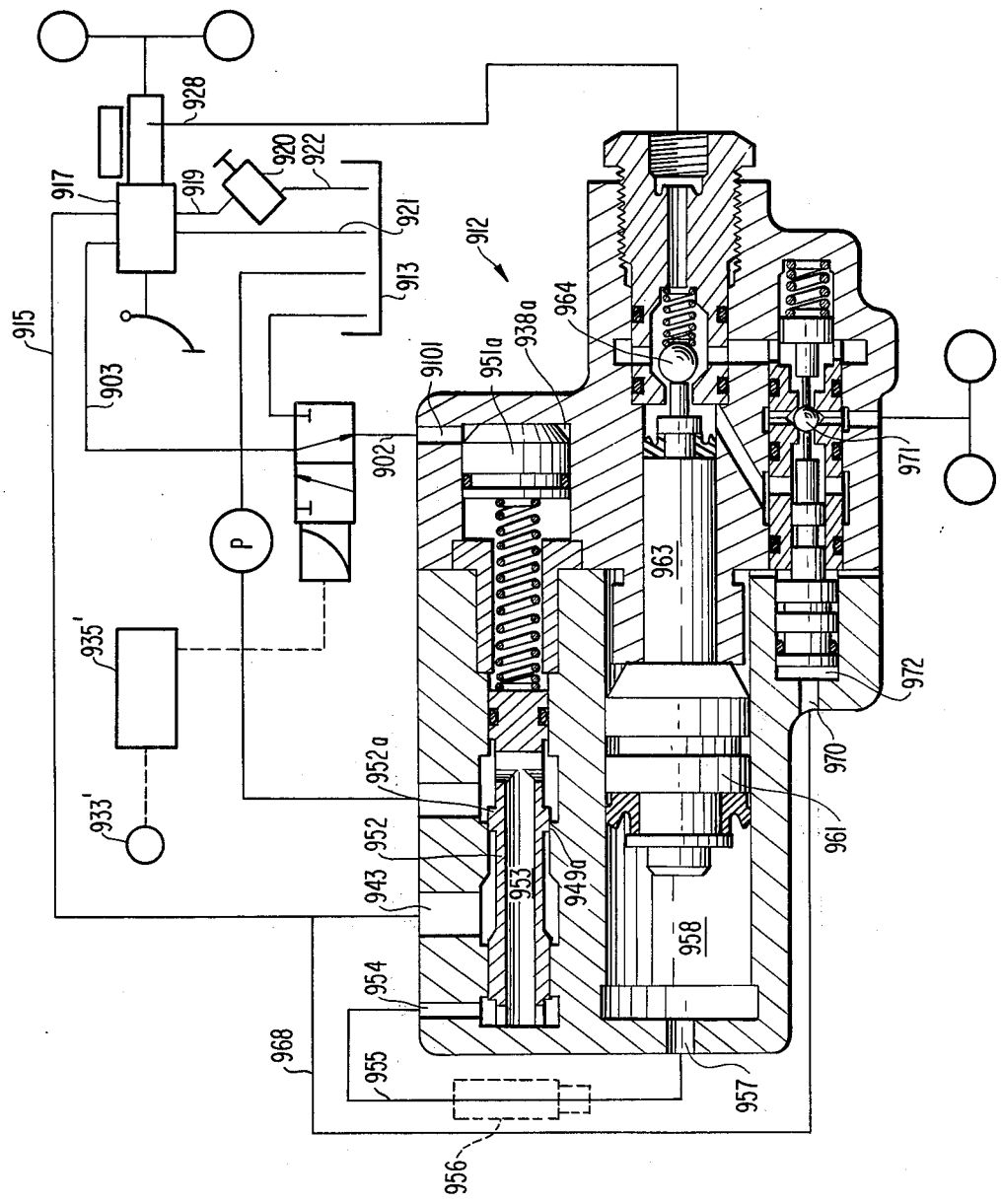
FIG. 12 is a view similar to FIGS. 1, 4, 5, 8 and 11 and showing a still further modified form of the invention.

The embodiment of this invention illustrated in FIG. 12 (using the prefix "9") is different from the embodiments of FIGS. 1 and 4 in that operational pressure $P_p$ in the booster 917 is admitted directly to the chamber 938a by way of a conduit 903, valve 956 and conduit 902 as was the case in the embodiment of FIG. 5. This is different from the embodiment of FIG. 11 wherein brake pressure $P_b$ to chamber 838a comes from master cylinder 824, through conduit 828, chamber 866, and passage 832.

However, the power pressure $P_p$ from booster 917 is in substantial proportion to the master cylinder pressure $P_b$ so that the same effect is achieved.

It is also to be noted in FIG. 12, that the solenoid switchover valve 956 may be disposed in the conduit 955 as indicated by dotted lines. Another difference in the embodiment of FIG. 12 from the embodiment of FIG. 4 is that the chamber 972 is connected to the port 943 via conduit 968 rather than to port 954.

Figure 13:
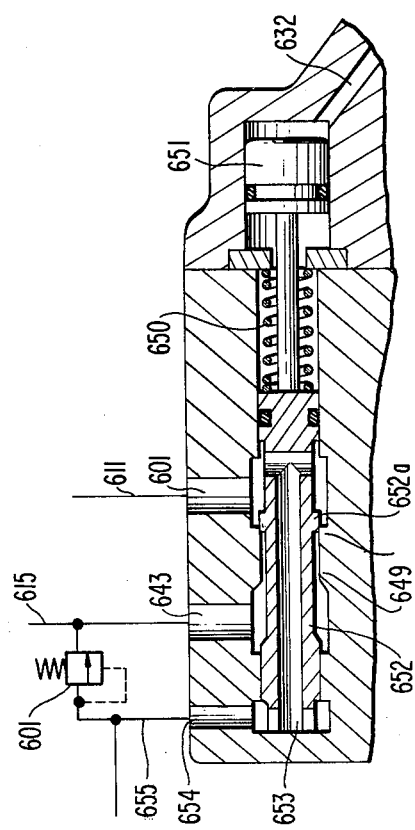
FIG. 13 is a view of a portion of FIG. 8 and showing a still further modified form of the invention.

In the embodiment of FIG. 13, instead of a stopper for the piston 651, the ports 654 and 643 are connected to each other by a short-cut conduit 655 provided with a relief valve 601. The operation of the valve 601 is selected in accordance with the line $c$-$d$ of FIG. 9. The pressure in the chamber 653 may be illustrated by the line 201 or 201'.

It will be apparent to those skilled in the art that various additions, substitutions, modifications, omissions, and variations may be made in the anti-skid control system of the invention without department from the scope or spirit of the invention.

What is claimed is:

1. In a hydraulic braking system for an engine-driven vehicle having front and rear wheel brakes, brake energization means including a master cylinder interconnected with said front rear wheel brakes and operable to effect pressurization thereof, and a cut-off valve between said master cylinder and said rear wheel brakes and operable to interrupt pressurization of said rear wheel brakes in response to a signal indicating a skid condition; the improvement which comprises pressure responsive means operably engaging said cut-off valve an acted upon by fluid pressure from said master cylinder, an engine driven fluid pressure source acting on said pressure responsive means in opposition to said master cylinder pressure and normally operable to hold said cut-off valve open, pressure control means between said fluid pressure source and said pressure responsive means and including means developing a predetermined minimum pressure in said fluid pressure source, said pressure control means including a housing having a bore, a control piston slidably disposed in said bore, means interconnecting said pressure control means and said brake energization means to vary the pressure from said fluid pressure source to said pressure responsive means in response to change in pressure developed by said brake energization means, said interconnecting means including a second piston slidable in a second bore and aligned with said control piston, said second piston being movable towards the control piston by pressure developed by said brake energization means, a compression spring caged between said control piston and said second piston, a control valve operable in response to a signal indicating a skid condition at said rear wheels to lower the pressure from said fluid pressure source to said pressure responsive means to close said cut-off valve and interrupt pressurization of said rear wheel brakes.

2. In a hydraulic braking system for an engine-driven vehicle having front and rear wheel brakes, brake energization means including a master cylinder interconnected with said front and rear wheel brakes and operable to effect pressurization thereof, and a cut-off valve between said master cylinder and said rear wheel brakes and operable to interrupt pressurization of said rear wheel brakes in response to a signal indicating a skid condition; the improvement which comprises pressure responsive means operably engaging said cut-off valve and acted upon by fluid pressure from said master cylinder, an engine driven fluid pressure source acting on said pressure responsive means in opposition to said master cylinder pressure and normally operable to hold said cut-off valve open, pressure control means between said fluid pressure source and said pressure responsive means and including means developing a predetermined minimum pressure in said fluid pressure source, said pressure control means including a housing having a bore, a control piston slidably disposed in said bore, means interconnecting said pressure control means and said brake energization means to vary the pressure from said fluid pressure source to said pressure responsive means in response to change in pressure developed by said brake energization means, said interconnecting means including a second piston slidable in a second bore and aligned with said control piston, said second piston being movable toward said control piston by pressure developed by said brake energization means, a compression spring caged between said control piston and said second piston, a control valve operable in response to a signal indicating a skid condition at said rear wheels to lower the pressure from said fluid pressure source to said pressure responsive means to close said cut-off valve and interrupt pressurization of said rear wheel brakes, and a safety valve between said cut-off valve and said rear wheel brakes and operable by pressure from said fluid pressure source to communicate said master cylinder to said rear wheel brakes through the normally open cut-off valve, said safety valve being operable upon failure of pressure from fluid pressure source to communicate the master cylinder to said rear wheel brakes through the cut-off valve.

3. In a hydraulic braking system for an engine-driven vehicle having front and rear wheel brakes, brake energization means including a master cylinder interconnected with said front and rear wheel brakes and operable to effect pressurization thereof, and a cut-off valve between said master cylinder and said rear wheel brakes and operable to interrupt pressurization of said rear wheel brakes in response to a signal indicating a skid condition; the improvement which comprises pressure responsive means operably engaging said cut-off valve and acted upon by fluid pressure from said master cylinder, an engine-driven fluid pressure source acting on said pressure responsive means in opposition to said master cylinder pressure and operable to hold said cut-off valve open, pressure control means between said fluid pressure source and said pressure responsive means and including means developing a predetermined minimum pressure in said fluid pressure source, said pressure control means further including a housing having a bore, a control piston slidably disposed in said bore, an inlet port in said housing communicating said fluid pressure source and said bore, a discharge port in said housing communicating said pressure responsive means and said bore, said control piston being movable in response to change in pressure developed by said brake energization means to balance the opposing forces on said pressure responsive means, means interconnecting said pressure control means and said brake energization means to vary the pressure from said fluid pressure source to said pressure responsive means in response to change in pressure developed by said brake energization means, said pressure control means further including opposing piston means slidably disposed in a second bore formed in said housing and generally aligned with said first mentioned bore, a compression spring caged between said opposing piston means and said control piston and operable to position said control piston to develop said predetermined minimum pressure in said fluid pressure source, said opposing piston means being acted upon by pressure from said brake energization means to bias said opposing piston means toward said control piston, a control valve operable in response to a signal indicating a skid condition at said rear wheels to lower the pressure from said fluid pressure source to said pressure responsive means to close said cut-off valve and interrupt pressurization of said rear wheel brakes.

4. In a hydraulic braking system the improvement as defined in claim 3 and which further includes stop means in said second bore limiting movement of said opposing piston means toward said control piston.

5. In a hydraulic braking system the improvement as defined in claim 3 wherein said opposing piston means includes inner and outer concentric pistons, said inner piston directly engaging said control piston, said compression spring being caged between said outer piston and said control piston.

6. In a hydraulic braking system the improvement as defined in claim 3 where said opposing piston means includes a piston which together with said control piston cages said compression spring.

7. In a hydraulic braking system the improvement as defined in claim 5 which includes stop means in said second bore limiting movement of the outer of said opposing pistons toward said control piston.

8. In a hydraulic braking system the improvement as defined in claim 3 wherein said pressure control means includes another discharge port in said housing communicating said bore with a fluid reservoir, said control piston and said bore having cooperable portions permitting restricted fluid flow from said inlet port to said another discharge port, said control piston being moveable under the force of pressurized fluid admitted to said inlet port and the force of said compression spring to adjust the position of said cooperable portions to control the balance of pressure to said pressure responsive means.

9. In a hydraulic braking system the improvement as defined in claim 4 wherein said pressure control means includes a second discharge port in said housing communicating said bore with a fluid reservoir, said control piston and said bore having cooperable portions permitting restricted fluid flow from said inlet port to said second discharge port, said control piston being moveable under the force of pressurized fluid admitted to said inlet port and the force of said compression spring and said opposing piston means to adjust the position of said cooperable portions to control the balance of pressure to said pressure responsive means.

10. In a hydraulic braking system the improvement as defined in claim 1 wherein said control valve is positioned between said fluid pressure source and said pressure responsive means and is operable, in response to said skid signal, to dump fluid pressure from said pressure responsive means to a reservoir.

11. In a hydraulic braking system the improvement as defined in claim 3 wherein said opposing piston means is biased toward said control piston by pressure from said brake energization means, and said control valve is positioned between said brake energization means and said second bore and is operable, in response to said skid signal, to dump fluid pressure from said another bore to a reservoir.

12. In a hydraulic braking system the improvement as defined in claim 3 wherein said compression spring is caged between a pair of telescoping retainers to fix the maximum length of said spring.

13. In a hydraulic braking system the improvement as defined in claim 1 wherein said pressure responsive means includes piston means slidable in a bore formed in said housing and having opposite ends thereof exposed to fluid pressure from said fluid pressure source and said master cylinder, respectively, said cut-off valve including a ball normally biased toward a cooperable seat, and said pressure responsive piston means being engageable with said ball to normally hold it spaced from said seat.

14. In a hydraulic braking system the improvement as defined in claim 2 wherein said pressure responsive means includes piston means slidable in a bore formed in said housing ad having opposite ends thereof exposed to fluid pressure from said fluid pressure source and said master cylinder, respectively, said cut-off valve including a ball normally biased toward a cooperable seat, said pressure responsive piston means being engageable with said ball to normally hold it spaced from said seat, said safety valve including a ball and an opposed pair of seats selectively engageable by said ball, said cut-off valve being connected to said safety valve by a pair of passages on opposite sides of said cut-off valve ball and said safety-valve ball, respectively, for connecting said master cylinder to said rear wheel brakes for either position of said cut-off valve ball.

15. In a hydraulic braking system the improvement of the type defined in claim 9 and which includes a relief valve connecting said discharge ports to permit relief of fluid pressure from said discharge port to said second discharge port and then to said reservoir.

* * * * *